(12) United States Patent
Lu et al.

(10) Patent No.: US 10,632,389 B1
(45) Date of Patent: Apr. 28, 2020

(54) PERFORMANCE MEASUREMENT IN A MULTI-PLAYER COMPUTER GAMING ENVIRONMENT

(71) Applicant: Outplayed, Inc., Camden, NJ (US)

(72) Inventors: Xing S. Lu, Maple Shade, NJ (US); Alan T. Liang, Maple Shade, NJ (US)

(73) Assignee: Outplayed, Inc., Camden, NJ (US)

( * ) Notice: Subject to any disclaimer, the term of this patent is extended or adjusted under 35 U.S.C. 154(b) by 0 days.

(21) Appl. No.: 15/656,770

(22) Filed: Jul. 21, 2017

(51) Int. Cl.
*A63F 13/798* (2014.01)

(52) U.S. Cl.
CPC .................................. *A63F 13/798* (2014.09)

(58) Field of Classification Search
CPC ....... A63F 13/798; A63F 13/795; A63F 13/86
See application file for complete search history.

(56) References Cited

U.S. PATENT DOCUMENTS

| | | | | |
|---|---|---|---|---|
| 7,437,362 B1 * | 10/2008 | Ben-Natan | .......... | G06F 21/6227 |
| 2004/0157654 A1 * | 8/2004 | Kataoka | .................. | A63F 13/12 463/4 |

OTHER PUBLICATIONS http://www.lolskill.net/about, ,Oct. 26, 2004 version, retrieved using waybackmachine, (https://web.archive.org/web/20141026184837/http://www.lolskill.net/about).*
My Top 3 Websites for: League of Legends, by HuzzyGames, published on Jan 4, 2016 https://www.youtube.com/watch?v=eYCbTuOeVmY.*
League of Legends—Profile Match History [LCU], by Madghost, published on Jun. 16, 2016 https://www.youtube.com/watch?v=gK8Q5FFrAxo.*
Riot API available to everyone; See more of your stats, by 92Garfield, published on Jul. 16, 2014 http://forums.euw.leagueoflegends.com/board/showthread.php?t=1814497.*

* cited by examiner

*Primary Examiner* — Jasson H Yoo
(74) *Attorney, Agent, or Firm* — Levisohn Berger LLP

(57) ABSTRACT

The invention provides a system and methods for measuring, displaying, and comparing player performance in a multi-player computer-based gaming system. The system and methods of the invention are useful for improving a player's performance by identifying strengths and weaknesses relative to other players. The system and methods are also useful for identifying team players, identifying strengths and weaknesses of opponents, developing strategies for dealing with specific opponents, and handicapping players and teams for entertainment and for wagering.

10 Claims, 6 Drawing Sheets

PERFORMANCE MEASUREMENT IN A MULTI-PLAYER COMPUTER GAMING ENVIRONMENT

RELATED APPLICATIONS

There are no related applications.

FIELD OF THE INVENTION

This invention relates to computer games, and more specifically to methods for monitoring and improving player performance in multiplayer games.

BACKGROUND

Among the wide variety of computer-based video games, a number of multiplayer online games have developed large and devoted followings. Organized, multiplayer video game competitions, known collectively as eSports, have evolved as the games have grown in popularity. The earnings potential for world-class players has risen in parallel with the growth of professional teams, leagues, tournaments, and championships, with teams of professional players competing for titles, trophies, and what have in recent years become multi-million-dollar cash prizes. Arena-sized crowds and the broadcasting of major eSports events have now become common. The most common video game genres associated with eSports are real-time strategy, fighting, first-person shooter (FPS), and multiplayer online battle arena (MOBA) games.

The potential for substantial earnings among the most highly skilled players has created a demand for skill-assessment and skill-improvement methods. The relevant skills vary with the game; for example, FPS games primarily involve hand-eye coordination and motor skills, while strategy and MOBA games require mental skills, strategic thinking, and the ability to apply knowledge and experience in the quest to out-think or out-maneuver one's opponents.

There is a need, especially in the category of MOBA gaming, for computer-based skill measurement, skill evaluation, and skill improvement methods that can provide players with quantitative measurements of their performance, and guide them in identifying the specific skills that need improvement. Such performance measurement tools are also useful to the managers of teams, who have a need to select players having complimentary skills so as to assemble a team with as few weaknesses as possible.

Quantitative measurements are also useful to the organizers and operators of leagues and tournaments, making it possible to more accurately conduct seeding and handicapping of players and teams, and to advertisers and sponsors with a need to rank and compare competitors. The availability of quantitative data can also improve the predictive value of head-to-head comparisons in advance of a given contest, and enable a player or team to craft a strategy tailored to exploit the weaknesses, and deflect or neutralize the strengths, of an upcoming opponent. Historical and up-to-date data can be made available to eSport fans as a method of increasing their interest and involvement.

The present invention provides tools, methods and systems intended to address all of the above needs, which are not adequately being met by existing technology.

SUMMARY OF THE INVENTION

The invention provides a method for measuring, improving, and comparing player performance in a multi-player computer-based gaming system. Game developers/operators usually maintain large databases, to which game play events and results are constantly being added. The system of the invention retrieves player data from such a database, formats it as necessary for use in a relational database, and makes the data available on request to users of the system via an interface that allows the user to request individual or team timeline statistics and performance metrics.

The system calculates average performance metrics (benchmarks) for players at various skill levels, and then compares the metrics of a given player to those benchmarks. The data is formatted as a time series, so that the benchmarks can be plotted as a function of game time, which makes it possible to determine whether the player is above or below the benchmark early in games (starts strongly), late in games (finishes strongly), or at any point in between.

The system of the invention allows players to see their strengths and weaknesses, and enables team managers or scouts to match players with complementary skills. Competitors can analyze the strengths and weaknesses of opponents and develop strategies accordingly. The system of the invention can also provide analyses and advice to players regarding which skills need to be improved upon. In certain embodiments, real-time performance metrics, rather than historical averages, can be displayed to a player in-game, as an aid to decision-making.

DETAILED DESCRIPTION OF THE INVENTION

Figure 1:
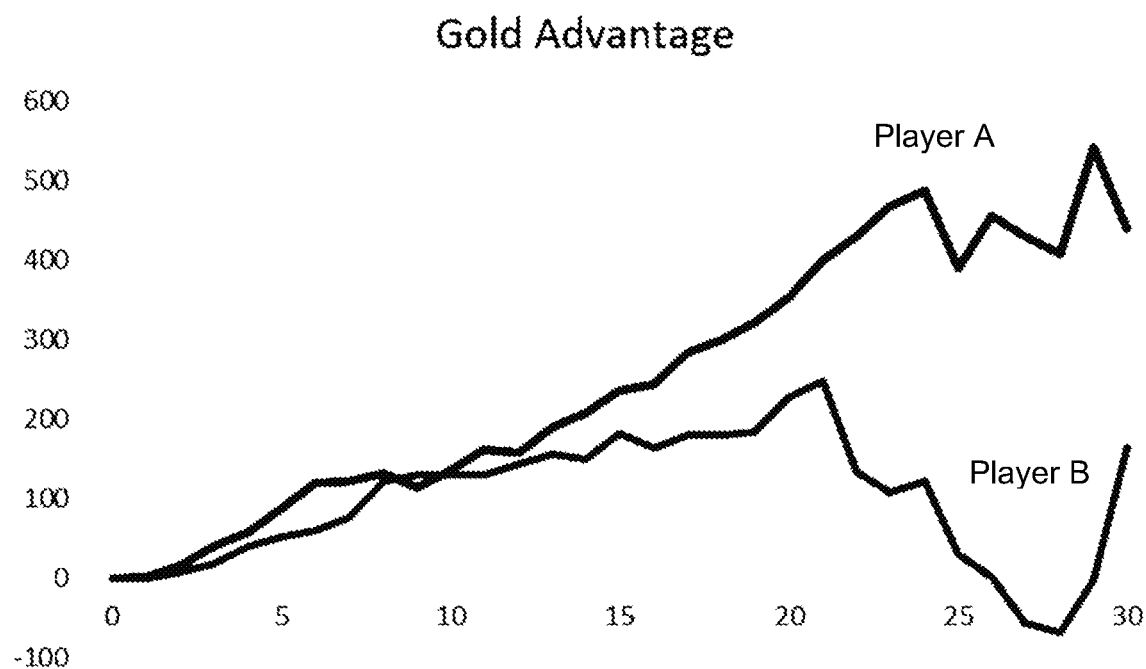
FIG. 1 is a player comparison showing the amount of gold acquired by two players, on average, during the first 30 minutes of play in the game League of Legends™ relative to a benchmark performance.

The invention provides a computer-implemented method and system for measuring and improving player performance in a multi-player computer-based gaming system. The invention provides a relational database containing player timeline statistics and player performance metrics for a plurality of players in a plurality of games. The method begins by receiving from a user a request for one or more of a first player's performance metrics, along with parameters for the requested metrics. The parameters for the request will generally limit the scope of the request to specific players, metrics, time frames, opponents, and other limits specific to the user's interest.

If the first player's metrics are not present in the database, the system receives the first player's game history data from an API provided by the computer-based gaming system, identifies and extracts the first player's timeline statistics and player performance metrics from the game history data, and stores the extracted timeline statistics and player performance metrics in the relational database. The system then retrieves from the database the requested player metrics within the request parameters.

If up-to-date metrics for the first player are present in the database, the system simply retrieves from the database the requested player metrics within the parameters. If up-to-date metrics for the first player are not present in the database, the system, substantially as describe above, updates the first player's game history data from the API, identifies and extracts updated timeline statistics and player performance metrics from the updated game history data, and stores the updated timeline statistics and player performance metrics in the relational database, before retrieving the requested metrics.

The system calculates benchmark averages for each performance metric, for players having the same skill level as the first player, or for players having some other skill level specified by the user in the parameters. The system also calculates benchmark expected win rates for players having the same skill level as the first player, or for players having some other skill level specified by the user in the parameters.

The system then calculates the first player's average for each performance metric given the specified parameters, and the first player's expected win rate given the specified parameters. For each performance metric, the system calculates the first player's average performance advantage or disadvantage relative to players having the same skill level as the first player, or relative to players having some other skill level specified by the user in the parameters.

The system then displays in graphical form, for each of the requested metrics, the first player's average performance advantage or disadvantage relative to players having the same skill level as the first player, or relative to players having some other skill level specified by the user in the parameters. Each relative advantage or disadvantage is plotted as a function of playing time, and the first player's expected win rate is also plotted as a function of playing time.

The method may, optionally, further comprise identifying the performance metric(s) and times the first player is performing better than average, and communicating quantitative and qualitative explanations to the player; identifying the performance metric(s) and times user is performing below average, and communicating quantitative and qualitative explanations to the player; and communicating improvement suggestions to the player.

The method may also be performed in real time, as the first player is engaged in the game.

On request from the user, the method may also display, in graphical form, a second player's average performance advantage or disadvantage relative to players of similar skill level, and the second player's expected win rate, as a function of playing time. Preferably the displays of the second player's metrics and win rate are overlaid on the displays of the first player's metrics and win rate. As used here, "display" refers to temporary display on a computer screen or monitor, and also to printed displays on tangible media such as paper, slides, or transparencies.

Another aspect of the invention is a computer-readable non-transitory storage medium, on which is stored executable program instructions for measuring and improving player performance in a multi-player computer-based gaming system, which when executed by a computer cause the computer to perform the above-described operations. Finally, the invention provides a system, comprising a computer with a display operationally networked with a server hosting a relational database of the invention, the computer having operational access to the above-described non-transitory storage medium and being programmed with the executable program instructions stored thereon.

More specifically, the invention comprises computer-implemented steps, beginning with the retrieval of player and team data from a database of game records and results. Such databases, containing metrics for both individual players and teams, are normally maintained by the operators of the games, and the data is routinely made available to players and interested parties through an API. By way of example, Riot Games, the developer and operator of the MOBA game League of Legends™, maintains a "Riot API" that allows registered players and developers to make web service requests for data from Riot servers. In particular, player metrics necessary to ongoing participation in the game, such as points, wealth, possessions, experience, special abilities and the like, are maintained in a database for use during play of the game, along with scores, win-loss statistics, and measures of player and team level of advancement. The methods of the invention will generally be applicable in connection with any game developer that maintains a publicly available API that allows third party programs to retrieve data.

The data retrieved by the method of the invention is formatted in a readable text-file format and stored in a relational database. Any suitable format, such as XML, YAML, JSON, or the like, may be employed. A preferred data format for the relational database is JavaScript Object Notation (JSON). Many APIs, such as the Riot API, return JSON-formatted data directly. From the data retrieved, timeline statistics, player performance metrics, and any other data that may later be required by the practitioner is identified and extracted. The extracted data are stored in a relational database, which in one embodiment is cloud-based and available to a global user base. Specialized applications of the invention, for example those employing proprietary algorithms designed to produce a competitive advantage for a team, may employ a local database with a restricted set of users.

The system of the invention provides an interface that allows a user to make a request to the system for individual or team timeline statistics and performance metrics. As used herein, a "user" may be a player interested in monitoring and improving his or her own performance, or a third party (e.g. a team captain, league manager, opponent, or bettor) interested in the metrics of a particular player or team. The request can be narrowed to data within specified parameters and filters, which are made available to the user by the system. The request for benchmarks can specify any number of user skill levels, and may specify the opponent skill level(s) against whom a benchmark is to be calculated. Most users will be interested in benchmarking opponents of similar skill level, but the system will be flexible to allow them to compare themselves against players of any combination of skill levels. The system of the invention determines if the requested team or player data is not yet in the database, and/or is not up-to-date, and if so, up-to-date player data is retrieved via the game API as described above, and processed into the relational database. The requested timeline statistics and performance metrics are then extracted from the database.

Benchmark averages for players at the skill level set in the request parameters (e.g., the skill level of a player submitting a request, or of a player of interest to the user making the request) are calculated and displayed. These benchmarks vary from game to game, and may include, but are not limited to, the value of acquired media of exchange (depending on the game, this may include, e.g., currency, gold, jewels, credits, "Riot points" and "influence points" in League of Legends™, and the like); experience points (e.g., game time, levels, ranks, points, indices of player strength and endurance); kills (e.g., "takedowns" and "creep score" in League of Legends™, enemies, monsters, or opponents killed, and the like); number of wins (in games having multiple contests within the overall game); and various game-specific scores (e.g., "creep score" in League of Legends™.)

Benchmark expectations for players at the skill level set in the request parameters are also calculated and displayed. Expectations include the expected win rate (i.e., the expected percentage of wins in a plurality of contests) for players at that skill level, against opponent(s) specified in the request parameters. The method of the invention takes advantage of the very large datasets that exist for popular games, to calculate with high precision the actual (and therefore expected) win percentages for players of a given skill level, in a given role within the game (e.g. a "champion" in League of Legends™) and/or having a given set of health, weapons, strengths and/or special powers, against a given opponent having specified experience, strengths, weaknesses, health, and weapons. The invention is not limited to any particular game, scoring system, or set of parameters, and can be adapted to any multiplayer online game having a sufficiently large dataset.

The system then calculates the requesting (or requested) player's actual average for each performance metric, given the parameters of the request, and the player's expected win rate against the opponent(s) and under the conditions specified in the request parameters. The expected win rate is based upon the player's recorded performance over time. For highly accomplished or experienced players, the data from their novice phase may not be relevant to their current level of play. Accordingly, in preferred embodiments, the performance metrics and/or the win rates may be based only on more recent recorded performances, e.g. a specified most recent time period, or they can be based on a specified number of most recent games. In alternative embodiments, the data associated with more recent performances can be weighted more heavily. The player's average performance advantage or disadvantage, relative to players of similar skill level, or to players of a specified higher skill level, may then be calculated for each performance metric.

In preferred embodiments, performance advantage data for each performance metric, and the player's expected win rates, are displayed in graphical format (e.g. line or bar graphs) to enable rapid assessment. The data is preferably displayed as a function of game time.

The system identifies the performance metric(s) where the player is performing better than average, and those in which the player is performing below average, and can present the metrics in graphical form as a function of game time. The system can communicate quantitative and qualitative explanations to the player, the latter function optionally provided by an expert system drawing on a knowledge base of explanations for observed fact patterns. Such embodiments can also communicate suggestions to the player for improving his or her performance.

One valuable feature of the present invention is the ability to develop new, unique, and proprietary metrics not available to the general population of players and users. Popular MOBA games, in particular, accumulate enormous datasets, which provide a rich source of inputs for novel and statistically robust linear and non-linear combinations of data. By way of example, one such proprietary metric is an adjusted gold metric that more accurately represents a player's true gold contribution to the team. This can be thought of as analogous to how True Shooting Percentage in basketball is a better measure of points scored per shot than field goal percentage is. In many games, gold is awarded to players who strike the final blow in taking an objective. Adjusted gold is calculated by attributing weighted percentages of the gold earned to teammates who deserve a portion of the credit.

Turning now to the drawings, FIG. 1 shows a comparison of the advantage, relative to their skill level peers, of the gold acquisition performance of two players "A" and "B". The plotted data is the average of the historical data for the two players over the first thirty minutes in a plurality of games of League of Legends™. The vertical axis zero is the average gold acquisition scores of all peers over all games over the same 30-minute period, and the plotted player "advantages" are relative to this benchmark.

The visualization provided by FIG. 1 shows both players to be above average for the first twenty minutes, but while player A continues to build an advantage, player B begins dropping to the average at that time. This informs player B that there is something in his strategy or style of play that changes at the 20-minute mark, leaving him at a considerable disadvantage to Player A. This may, for example, reflect a strategy of spending more and spending it sooner, or a strategy of abandoning gold acquisition in favor of seeking other goals; a review of other metrics will reveal if the strategy is successful. Alternatively, player B may simply have a bad habit of becoming distracted by other late-game concerns, which has been revealed by this analysis. Player A may be more accomplished at striking the fatal blow to enemy minions and monsters, or may have a strategy of acquiring passive sources of gold earlier in the game.

As to the horizontal (time) axis, the first thirty minutes of League of Legends™ play shown in this example has been found to be an appropriate span over which meaningful data can be acquired and evaluated. Different time windows, appropriate to the pace of play, may be employed for other games. In certain embodiments, particularly in less-interactive games where the time of play may be highly variable, the time axes of different games may be normalized prior to calculation of the historical performance metrics. An assessment of player performance over the course of a single game can be carried out if desired; this can be useful information for players wishing to monitor their performance in real time. In this embodiment, the graphical data will be real-time data rather than averaged data, and it is presented in real time to the player in the course of playing the game. A player or team leader may find this real-time performance information valuable when making strategic decisions during the game.

Figure 2:
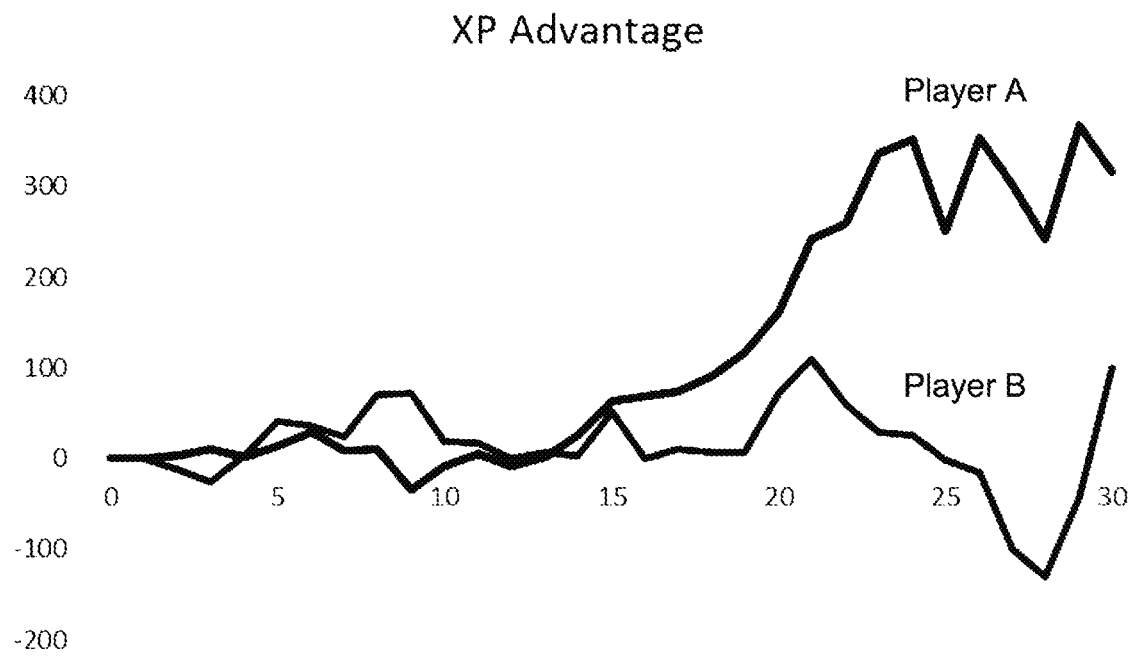
FIG. 2 is a player comparison showing the experience points acquired by two players, on average, during the first 30 minutes of play in the game League of Legends™ relative to a benchmark performance.

FIG. 2 shows a plot of "XP" (experience points) advantage for the same two players, again over the first 30 minutes of play, and again this is the players' average data over all games in the database, measured against the benchmark of all players of comparable skill. Player B is shown to be close to average throughout his games, while player A is shown to be exceptionally skilled at acquiring XP after the 20-minute mark. The curves parallel those for gold advantage (FIG. 1), suggesting that there is a common factor affecting these metrics for both players.

Figure 3:
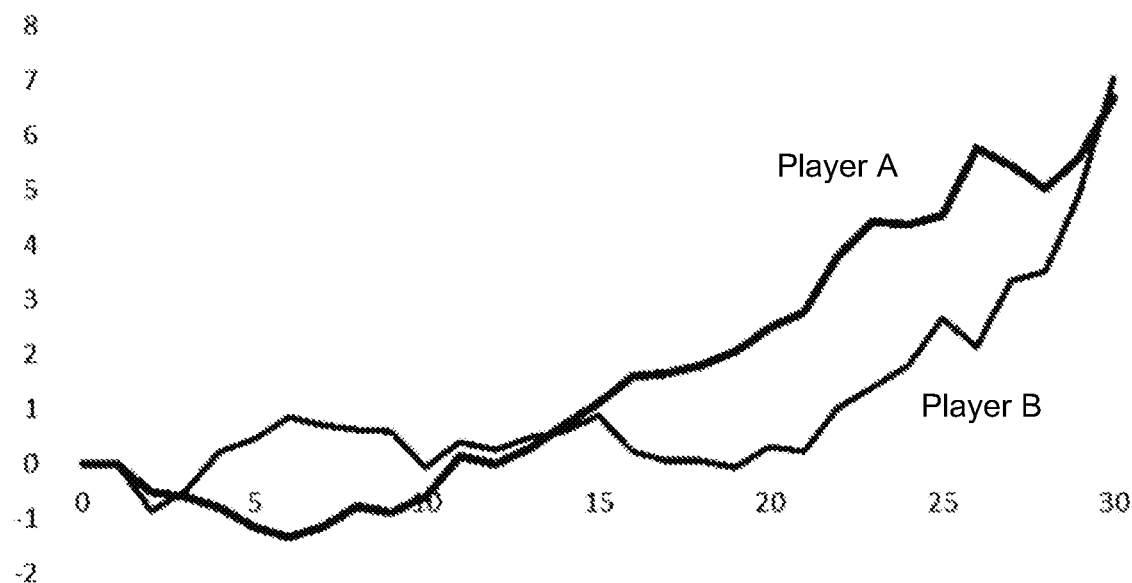
FIG. 3 is a player comparison showing the "creep score" earned in the jungle by two players, on average, during the first 30 minutes of play in the game League of Legends™, relative to a benchmark performance.

FIG. 3 shows a plot of average "Jungle CS" (Jungle Creep Score) advantage for the same two players, over the first 30 minutes of play, against a comparable-skill benchmark as in FIGS. 1 and 2. The "Jungle" is a virtual area in the geography of League of Legends™ game play, and "creep score" is a measure of a player's success in killing off monsters and minions. The creep score is a metric provided by the game's developers, and as such the present system need not calculate it, but can download it directly. Jungle CS is a specific measure of one's skill at killing monsters, but it is dependent upon both skill and time spent in the jungle.

Figure 4:
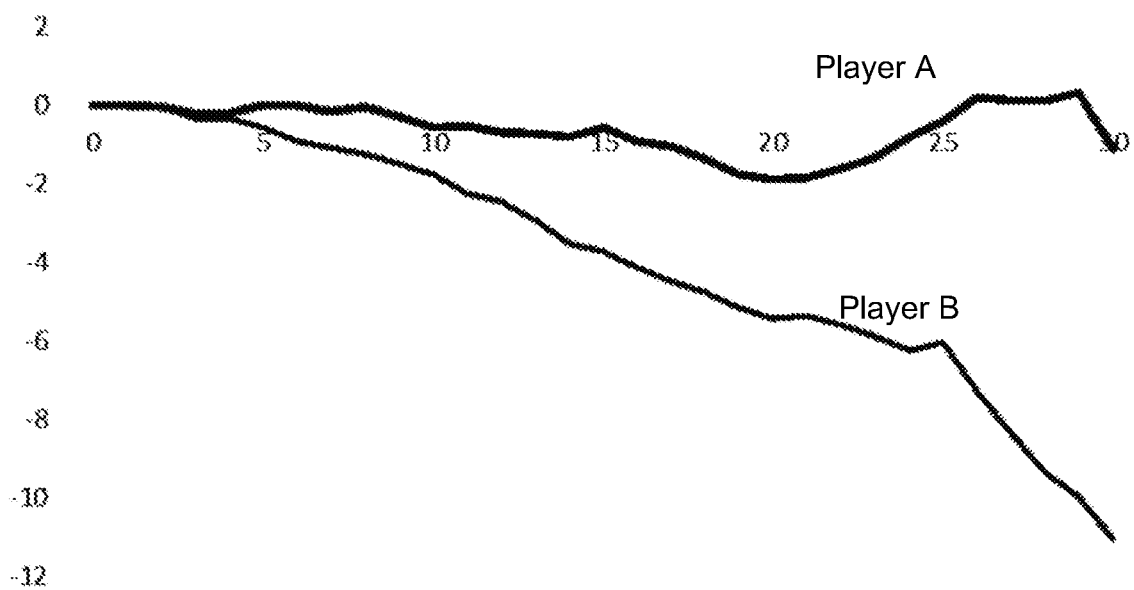
FIG. 4 is a player comparison showing the overall "creep score" earned by two players, on average, during the first 30 minutes of play in the game League of Legends™ relative to a benchmark performance.

FIG. 4 shows a plot of CS score advantage for the same two players over the first 30 minutes of play, relative to a comparable-skill benchmark. Player A appears to accumulate CS at a rate comparable to the benchmark, i.e., his performance metric is average. Player B steadily falls behind the benchmark on this metric, with the decline continuing throughout the 30-minute time window. Player B's takedown skills outside of the Jungle appear to be very limited, but a user assembling a team might identify him as a good choice for a designated team "jungler".

Figure 5:
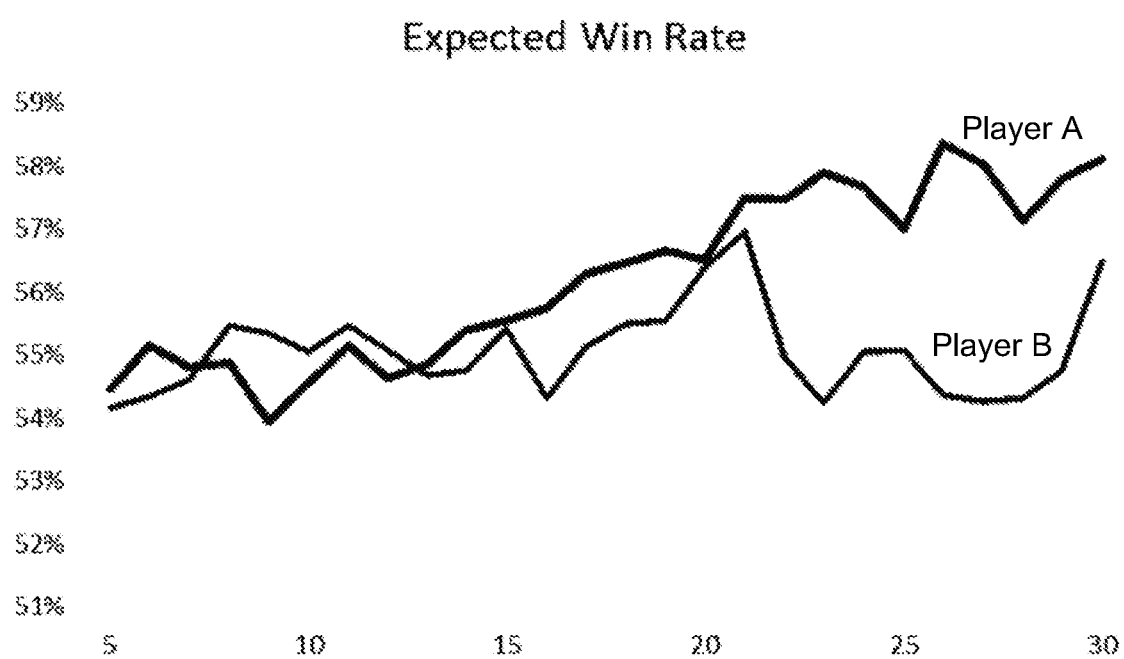
FIG. 5 is a player comparison showing the expected win rate of two players, on average, during the first 30 minutes of play in the game League of Legends™, relative to a benchmark win rate.

Turning to FIG. 5, a flow chart outlines the steps taken by the system of the invention to obtain, format, and store player information in the relational database. Upon start 600, the system first identifies at 610 the latest version of the game via the game API, and at 620 determines if this matches the version most recently accessed by the system. If the versions are the same, the database is up to date, and the system exits at 690. If the online version is more recent than the version last accessed, the system identifies at 630 the players active in the database, and at 640 identifies which of those have been active online since the last update. At 650, raw data for each identified player is retrieved via the game API. The data is converted at 660, if necessary, to the format used by the database, and at 670 the converted data for the identified players is entered into the database. At 680 the database is saved, and the method exits at 690.

Figure 6:
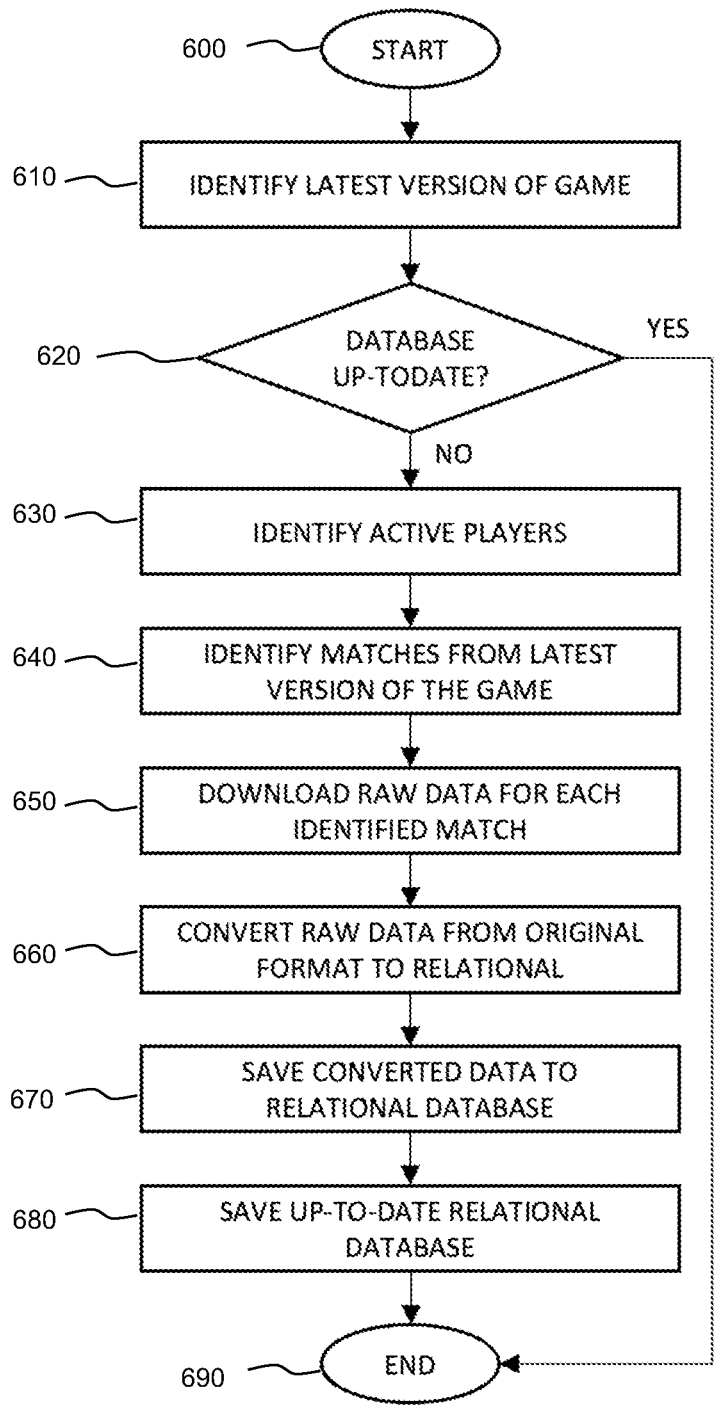
FIG. 6 is a flow chart showing the process of updating the relational database by retrieving raw data from a game's server.
Figure 7:
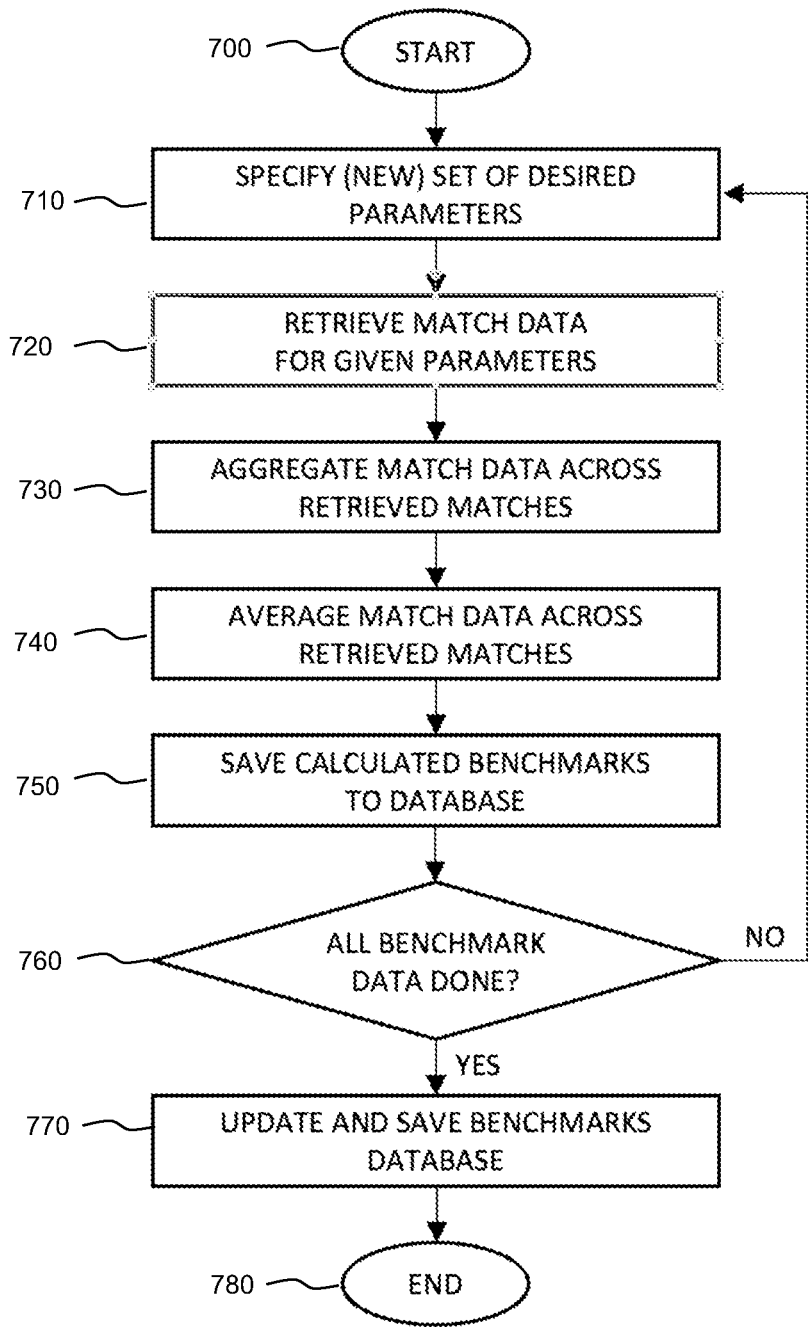
FIG. 7 is a flow chart showing the process of generating benchmarks.
Figure 8:
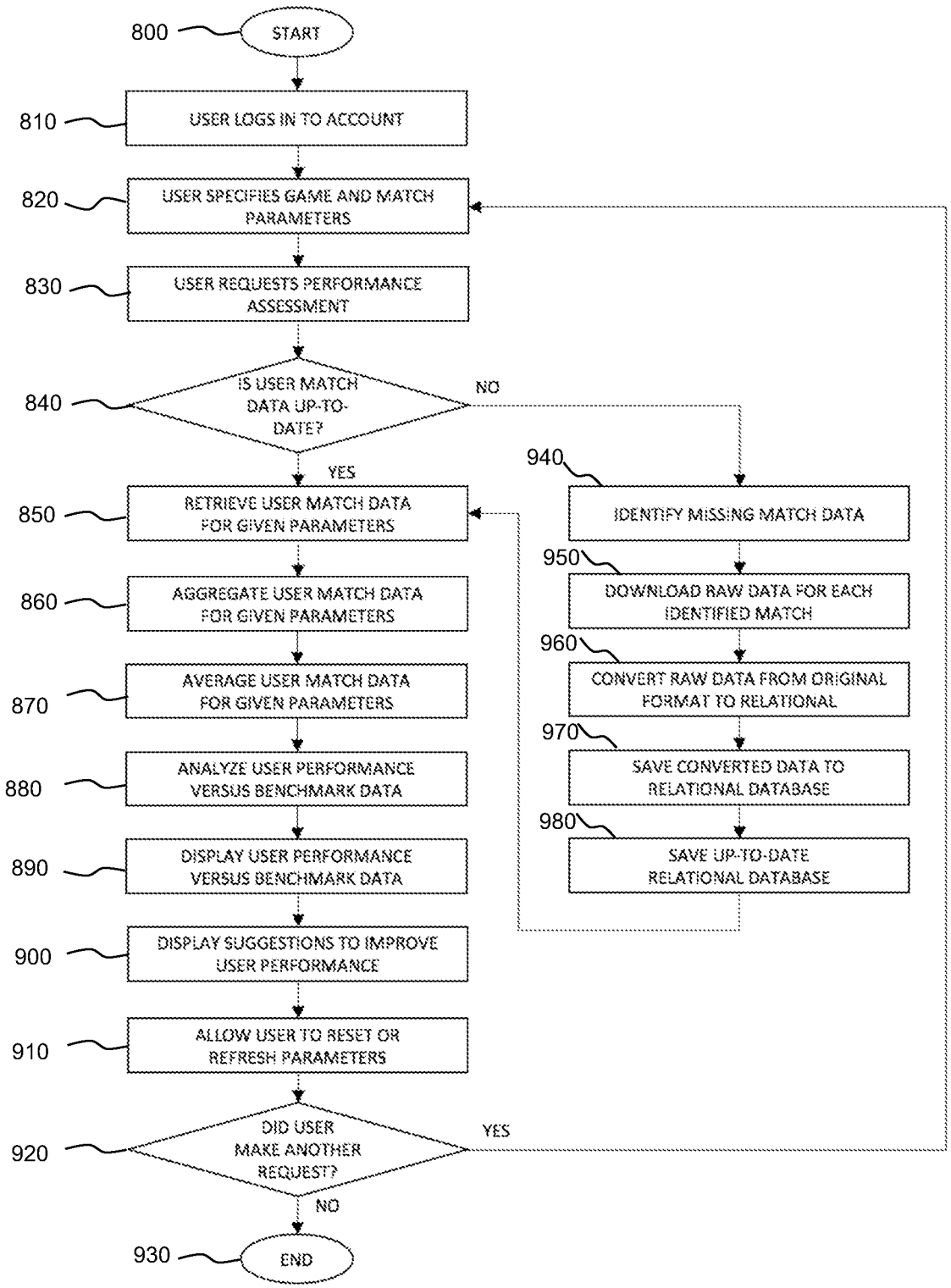
FIG. 8 is a flow chart showing the process of analyzing and displaying player performance.

FIG. 6 is a flowchart showing the creation of benchmarks for the metrics used by the invention. Upon start 700, the system receives at 710 specified metrics and request parameters from a user. At 720 the relevant match data for all players of the specified (at 710) skill level is retrieved from the database, and at 730 the data is aggregated across all the retrieved matches. At 740 the aggregated data is averaged to provide benchmark scores for each time point in the time window, which may be pre-defined or may be set by the user at 710. The benchmark values are stored in the database at 750. If the user has additional requests and/or parameters, the system at 760 loops back to 710 to receive and process the new request. Otherwise, the database, with the new benchmarks, is saved at 770 and the process then exits.

FIG. 6 is a flowchart showing the generation and delivery of performance metrics to a user. The process starts at 800, and at 810 login information from a user is received and verified. After successful login, the user enters a request for performance metrics for a specified player (the user may be, but need not be, be the player) and the request parameters, at 830. At 840 the system checks the database to see if the match data for the requested player is up to date, or if new player data is available from the API. If the database is up to date, the system retrieves at 850 the match data for the requested player within the user-specified parameters. The player's match data is aggregated at 860 and averaged at 870, and the results compared at 880 to benchmark data for players of the same skill level, unless the user has specified some other benchmark for comparison.

At 890 the player's metrics, preferably in the form of advantage or disadvantage relative to the benchmark, is displayed. Optionally, the same data for one or more other players may be called up and overlaid in the display. At 900, the system retrieves and displays suggestions for improvement of the performance. Such suggestions can be "canned" suggestions selected based on simple pattern recognition, or they can be obtained from an expert system having any desired level of sophistication. At 910 the user is given the opportunity to make further requests and/or or refinements to the parameters. If there are additional requests, the method loops at 920 back to 820, otherwise the method exits at 930.

If, at 840, the system detects that the data for the requested player is not up to date, the method branches to 940, where missing match data is identified and retrieved at 950 via the game API. Conversion of the raw data to the database format takes place at 960, the converted data is written to the database at 970, and the updated database is saved at 980. The method then returns to 850 where the requested player's updated match data can now be retrieved from the database.

The above descriptions of the invention, and the displays of player performance metrics and flowcharts presented in the drawings, are not intended to be limiting, but rather are intended to be exemplary embodiments of the invention. Those skilled in the art will readily appreciate that obvious variations on the described and outlined processes can be implemented, and the invention is contemplated to encompass such modifications.

We claim:

1. A method for measuring and improving player performance in a multi-player computer-based gaming system, comprising performing in real time, while a first player is engaged in playing a multi-player computer-based game wherein the first player controls the actions of a champion, the computer-implemented steps of:

(a) providing a relational database containing player timeline statistics and player performance metrics for a plurality of players in a plurality of games;

(b) receiving from a user a request for one or more of the first player's performance metrics, and parameters for the requested metrics;

(c) if the one or more of the first player's metrics are not present in the database, receiving the first player's game history data from an API provided by the computer-based gaming system, identifying and extracting the first player's timeline statistics and player performance metrics from the game history data, storing the extracted timeline statistics and player performance metrics in the relational database, and retrieving from the database the requested player metrics within the parameters; otherwise (d) if up-to-date metrics for the first player are present in the database, retrieving from the database the requested player metrics within the parameters; otherwise (e) if up-to-date metrics for the first player are not present in the database, updating the first player's game history data from the API, identifying and extracting updated timeline statistics and player performance metrics from the updated game history data, storing the updated timeline statistics and player performance metrics in the relational database, and retrieving from the database the requested player metrics within the parameters;

(f) calculating:
  (i.) benchmark averages for each performance metric, for players having a skill level specified in the parameters;
  (ii.) benchmark expected win rates for players having the same skill level as the first player, relative to players having a skill level specified in the parameters;
  (iii.) the first player's average for each performance metric given the specified parameters;
  (iv.) the first player's expected win rate given the specified parameters; and
  (v.) for each performance metric, the player's average performance advantage or disadvantage relative to players of similar skill level, and
  (vi.) for each performance metric, the player's average performance advantage or disadvantage relative to players of a higher skill level specified in the search parameters; and (g) displaying in graphical form one or more of:
  (i.) for at least one of the one or more requested player metrics, the first player's average performance advantage or disadvantage relative to players of similar skill level, as a function of playing time in the game in which the first player is engaged while the game is in play and while the first player is controlling the actions of the champion, and
  (ii.) the first player's expected win rate, as a function of playing time in the game in which the first player is engaged while the game is in play and while the first player is controlling the actions of the champion.

2. The method of claim 1, further comprising the steps of:
(h) identifying the performance metric(s) and times the first player is performing better than average and communicating quantitative and qualitative explanations to the player;
(i) identifying the performance metric(s) and times user is performing below average and communicating quantitative and qualitative explanations to the player; and
(j) communicating improvement suggestions to the player.

3. The method of claim 2, further comprising the calculation, benchmarking, and display of player performance metrics not provided in the game history data.

4. The method of claim 1, further comprising displaying in graphical form one or more of:
  (i.) for at least one of the one or more requested player metrics, a second player's average performance advantage or disadvantage relative to players of similar skill level, as a function of playing time, and
  (ii.) the second player's expected win rate, as a function of playing time;
  wherein the displays of the second player's metrics and win rate are overlaid on the displays of the first player's metrics and win rate.

5. The method of claim 4, further comprising the calculation, benchmarking, and display of player performance metrics not provided in the game history data.

6. The method of claim 1, further comprising the calculation, benchmarking, and display of player performance metrics not provided in the game history data.

7. The method of claim 1, wherein the multi-player computer-based game is League of Legends.

8. A computer-readable non-transitory storage medium storing executable program instructions for measuring and improving player performance in a multi-player computer-based gaming system, which when executed by a computer cause the computer to perform, in real time, while a first player is engaged in playing a multi-player computer-based game wherein the first player controls the actions of a champion, operations comprising:

(a) receiving from a user a request for one or more of the first player's performance metrics to be retrieved from a database, and parameters for the requested metrics;
(b) if the one or more of the first player's metrics are not present in the database, receiving the first player's game history data from an API provided by the computer-based gaming system, identifying and extracting the first player's timeline statistics and player performance metrics from the game history data, storing the extracted timeline statistics and player performance metrics in the relational database, and retrieving from the database the requested player metrics within the parameters; otherwise
(c) if up-to-date metrics for the first player are present in the database, retrieving from the database the requested player metrics within the parameters; otherwise
(d) if up-to-date metrics for the first player are not present in the database, updating the first player's game history data from the API, identifying and extracting updated timeline statistics and player performance metrics from the updated game history data, storing the updated timeline statistics and player performance metrics in the relational database, and retrieving from the database the requested player metrics within the parameters;
(e) calculating:
  (i.) benchmark averages for each performance metric, for players having a skill level specified in the parameters;
  (ii.) benchmark expected win rates for players having the same skill level as the first player, relative to players having a skill level specified in the parameters;
  (iii.) the first player's average for each performance metric given the specified parameters;
  (iv.) the first player's expected win rate given the specified parameters; and
  (v.) for each performance metric, the player's average performance advantage or disadvantage relative to players of similar skill level, and
  (vi.) for each performance metric, the player's average performance advantage or disadvantage relative to players of a higher skill level specified in the search parameters; and
(f) displaying in graphical form one or more of:
  (i.) for at least one of the one or more requested player metrics, the first player's average performance advantage or disadvantage relative to players of similar skill level, as a function of playing time in the game in which the first player is engaged while the game is in play and while the first player is controlling the actions of the champion, and
  (ii.) the first player's expected win rate, as a function of playing time in the game in which the first player is engaged while the game is in play and while the first player is controlling the actions of the champion.

9. The computer-readable non-transitory storage medium according to claim 8, wherein the executable program instructions, when executed by the computer, further cause the computer to perform operations comprising:
- (g) identifying the performance metric(s) and times the first player is performing better than average and communicating quantitative and qualitative explanations to the player;
- (h) identifying the performance metric(s) and times user is performing below average and communicating quantitative and qualitative explanations to the player; and
- (i) communicating improvement suggestions to the player.

10. The computer-readable non-transitory storage medium of claim 8, wherein the multi-player computer-based game is League of Legends.

* * * * *